Oct. 20, 1931.     A. SCHMID     1,828,204
ELECTRIC BATTERY
Filed June 9, 1927
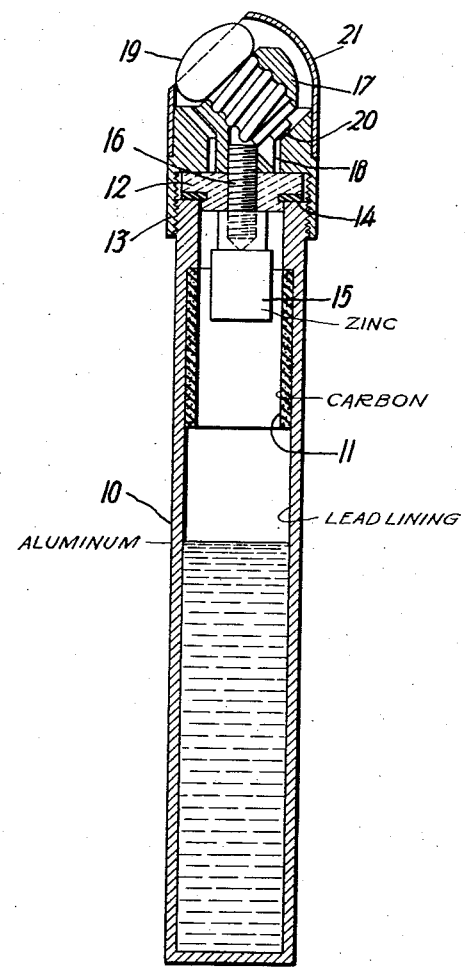
Inventor
Alfred Schmid
by
Dean, Fairbank, Albright & Hirsch
Attorneys Patented Oct. 20, 1931

1,828,204

UNITED STATES PATENT OFFICE

ALFRED SCHMID, OF BASEL, SWITZERLAND

ELECTRIC BATTERY

Application filed June 9, 1927, Serial No. 197,528, and in Germany December 2, 1926.

This invention relates to electric batteries, particularly of the portable type which may serve for supplying current to an electric light carried by the battery casing.

The main objects of my invention are to provide a construction which is light in weight, inexpensive to manufacture, easy to operate, and in which the electrolyte and cathode may be easily replaced when necessary.

As one important feature of my invention I so design the parts and use such an electrolyte that the liquid chamber may be sealed hermetically as there is no liberation of gas during the use of the battery.

As another important feature I so mount the anode that although it is of carbon, no liquid may seep through it to the exterior of the casing.

As another important feature I employ an electrolyte which may be put up in solid or other concentrated form in quantities sufficient for a single charge, and diluted to the required strength when used.

As another important feature I provide a cap which serves for holding the various parts of the battery together and which also serves as a support for the electric lamp.

As another important feature I employ a chamber of such material that it will serve as a conductor but will not be in any way corroded by the acid electrolyte employed, and I provide a liner of carbon for at least a portion of this vessel or chamber, the wall of the vessel itself serving as the sole connection between the carbon liner and the exterior of the battery.

Various other important features will be pointed out in connection with the following description of a preferred embodiment, or will be apparent from the accompanying drawing.

The drawing, in the single figure, shows a central vertical section through a construction embodying my invention.

In the construction illustrated I provide a vessel or chamber 10 which serves various different functions. It is of a material which will conduct the electric current, but at least its inner surface is such that it will not be corroded by the electrolyte. The vessel is preferably made of aluminum because of its light weight, and has a lead lining to protect the aluminum against the action of the electrolyte. The lining may be only a few tenths of a millimeter in thickness. The whole vessel might be made of monel metal, chrome nickel steel, or other alloys having the desired characteristics of conductivity and resistance to acid action in which case no lining is necessary.

The vessel is preferably in the form of a small tube closed at one end, and of such capacity that the desired amount of electrolyte may be stored in the lower portion thereof normally out of contact with the electrodes.

Within the vessel there is provided a liner 11 which is a conductor of the first class. This is preferably a sleeve or tube of carbon pressed or molded into the tube and having its upper end terminating below the upper end of the tube. The liner is shown as occupying only a short portion of the upper half of the tube, although it might extend throughout the entire length of the tube if desired. The liner which serves as the anode has no connection with the exterior of the vessel except through the wall of the latter. Thus the electrolyte which may permeate the pores of the carbon or tend to seep through the latter cannot escape to the exterior of the device. In order to prevent the accumulation in the pores of the carbon of the salts resulting from the reduction of the depolarizer the carbon may be impregnated with paraffin or aevolit, (an acid-resistant artificial resin).

The upper end of the vessel is hermetically closed by a plate or closure 12 which may be in the form of a disk of aevolit clamped tightly against the end of the tube. Other material than aevolit might be used if it be acid-resistant, capable of being threaded to receive the cathode support, non-porous, and capable of withstanding heavy pressure in the hermetic sealing of the vessel.

The disk may be clamped in place by a metal collar 13 having an interiorly threaded flange adapted to be screwed on to the end of the tube. This cap is also preferably of aluminum although it may be of any light, strong metal which will serve as a conductor. The seal between the disk and the end of the tube may be effected by a washer 14 of rubber or other suitable material, or a film of grease.

The disk 12 serves as a support for the cathode. Extending through the disk is a conductor which is of a material which will not be effected by the electrolyte. For this purpose I preferably employ chrome nickel steel, and the conductor is in the form of a short, double-ended screw having its opposite ends projecting above and below the disk and its intermediate portion threaded in the disk and permanently affixed thereto. The cathode is a bar or block 15 which is screwed to the lower or inner end of the conductor 16. This has zinc as its active constituent and may be of pure zinc, although preferably it is a zinc amalgam. It is of such size that it does not contact with the carbon liner 11 and is preferably of such length that it extends down into said liner.

Screwed onto the outer end of the conductor 16 is a lamp support 17 of metal or other conducting material. This may be of aluminum and is spaced from and entirely out of contact with the collar 13. The outer end of the lamp support 17 has a threaded passage to receive a small electric lamp. This threaded passage is preferably at an angle of about 45° to the axis of the tube, and the outer end of the collar 13 is reamed out to provide a conical surface against which the center terminal 20 of the lamp may engage at any point along said surface. Thus, the collar 13 and the lamp support 17 may be tightly screwed in place independently of each other. The threaded shell or outer terminal of the stem of the lamp is electrically connected to the cathode through the lamp support 17 and the conductor 16, while the center terminal of the lamp is connected to the anode through the collar 13 and the wall of the vessel 10.

If desired, the outer end of the collar 13 may be provided with a cap 21 for protecting the parts and providing an aperture encircling the outer portion of the lamp.

The electrolyte which I employ includes sulphuric acid and an oxidizing salt, and preferably also includes a compound which will reduce the hydrogen ion concentration of the solution. The oxidizing agent is preferably sodium dichromate ($Na_2Cr_2O_7$), and the compound used for reducing the hydrogen ion concentration is preferably borax. These compounds in solution in water, are used in the vessel 10, but the quantity employed is such that the electrolyte does not normally contact with the cathode 15 and preferably does not contact with the anode or carbon liner 11. Thus when the tube is in a vertical position, as shown in the drawing, no current is generated. When it is desired to use the lamp, the tube is held in a horizontal position or is inverted, or is tilted to such position that the electrolyte comes into contact with the cathode. The flow of current is thus controlled solely by the tilting of the vessel, and no switch or other circuit controller is needed. When not in use, the tube may stand on end, and when in use will normally be held in the hand in such position that the rays of the light may be thrown in any direction. As the axis of the lamp is at an angle to the axis of the tube, a rotation of the tube when in a horizontal position will throw the light up, down, or laterally.

If desired, a valve may be employed in a partition intermediate of the ends of the vessel, so that the electrolyte may be prevented from flowing to the electrodes, or after the vessel is inverted the electrolyte may be prevented from flowing away from them.

As one important feature of my invention I provide the materials going to make up the electrolyte in a concentrated form in portions of the proper size to provide enough electrolyte for a single charge. The vessel may be kept empty during storage or transportation, and when it is to be used the collar 13 and the disk 12 may be removed, a charge dropped into the vessel, and sufficient water poured in to dissolve the solids and bring the liquid level to the desired height. The parts 12 and 13 may then be replaced and the device is ready for immediate use.

The charge may be in concentrated liquid form or in the form of a paste or semi-liquid mass or in the form of a tablet. If in semi-liquid form it may be put up in small, collapsible lead tubes, such as commonly employed for tooth paste, although instead of having a screw cap, the tube preferably has a closed end which may be broken off when the contents are to be used. To make it in solid or tablet form I preferably precipitate silicic acid in colloidal form ($H_2SiO_3$) by adding sulphuric acid to water glass ($Na_2SiO_3$). I then mix the ingredients in the following proportions:

25 gr. solid sodium dichromate.
57 gr. concentrated sulphuric acid.
15 gr. colloidal silicic acid.
5 to 10 gr. of borax, if desired.

This is heated to about 160° C. The resulting solid mass may be sold in loose, granular form in a package, or may be compressed into tablet form, each tablet or package being such size as to make a single charge for the battery.

When the electrolyte is exhausted it may be dumped out and a fresh charge put in. The electrolyte is sufficiently inexpensive to permit the charge to be thrown away after each use, if desired, even though not exhausted. The cathode may also be unscrewed and replaced by a new one whenever occasion requires. The cathodes, particularly if of zinc amalgam are preferably coated with a thin layer of paraffin to protect them before being used. This, or a part thereof, may be scraped off just before the cathode is inserted. The anode or carbon sleeve does not deteriorate in use and is permanently held in position and protected against breakage or injury during manipulation of the device.

The device is particularly adapted for use as a pocket flashlight, as the entire height may be only three or four inches, and the diameter less than an inch, so that it is readily carried in an upright position in the pocket. Extra cartridges or charges for making the electrolyte, and extra cathodes may also be conveniently carried for use when required.

The sodium dichromate or other oxidizing material serves as a depolarizing agent and prevents the formation of gas. The paraffin or other material with which the carbon sleeve is impregnated, prevents the penetration of the electrolyte to contact with the wall of the vessel directly outside of and in contact with the sleeve. The character of the electrodes and the electrolyte permits the hermetic sealing of the vessel, and the maner in which the cathode is supported permits of its ready replacement. All of the portions of the device with which the electrolyte may come in contact, except for the cathode, are of material which will not be corroded or in any way affected by the electrolyte. This includes the vessel itself, the carbon sleeve, the disk or cover, and the conductor or cathode support.

Having thus described my invention, what I claim as new and desire to secure by Letters Patent is:—

1. A portable self-contained electric light, including a metallic container for a liquid electrolyte, a cover of non-conducting material adapted to hermetically seal said container, a conductor extending through said cover, an electrode secured to the inner end of said conductor, a lamp socket connected to the outer end of said conductor, and means for connecting one terminal of the lamp to the wall of the container.

2. A portable self-contained electric light, including a metallic container for an electrolyte, a cover of non-conducting material, a conductor extending through said cover, an electrode secured to the inner end of said conductor, a lamp socket connected to the outer end of said conductor, and a metallic collar for securing said cover in position and engaging with said container, a portion of said collar being adapted to engage with one terminal of a lamp carried by said lamp support.

3. A portable self-contained electric light, including a metallic container for an eyectrolyte, a cover of non-conducting material, a conductor extending through said cover, an electrode secured to the inner end of said conductor, a lamp socket connected to the outer end of said conductor, and adapted to hold a lamp with its axis at an angle to the axis of the container, and an annular member connected to said container and adapted to engage with the center terminal of the lamp.

4. A self-contained portable electric light, including an electrolyte container of conducting material, a cover of non-conducting material, a cathode depending from said cover, a carbon sleeve on the inner wall of said container, a conducting collar for holding said cover, and a lamp support carried by said cover and connected to said cathode, and adapted to hold a lamp with one terminal in engagement with said collar.

5. A self-contained portable electric light, including an electrolyte container formed of aluminum and having a lead lining, a carbon sleeve on the inner wall of said container, a non-conducting cover for said container and adapted to seal the latter hermetically, a zinc cathode carried by said cover, and means carried by said cover for supporting a lamp and connecting the terminals thereof to said cathode and to the wall of the container respectively.

6. An electric light including a container for an electrolyte solution, a sleeve of carbon within the upper portion of the container and carried by the peripheral wall of the latter, a cover of non-conducting material, a cathode depending from said cover, and a pair of conducting members one carried by said cover and the other serving to hold said cover on said container, one of said members serving as a lamp support and the other having a surface adapted to engage with a terminal of a lamp.

7. An electric battery including a metal tube having an anode sleeve of carbon intermediate of its ends and carried by the inner surface of the peripheral wall, said wall serving as the electric connection to said anode, a cover of non-conducting material hermetically sealing one end of said tube, a conductor extending through said cover, a cathode carried by said conductor, said conductor being of chrome nickel steel and said cathode being of zinc amalgam and detachably secured thereto, and an electrolyte containing a depolarizer and movable out of contact with one of said electrodes to stop current generation.

8. An electric battery including a metal tube having an anode sleeve of carbon intermediate of its ends and carried by the inner surface of the peripheral wall, said wall serving as the electric connection to said anode, a cover of non-conducting material hermetically sealing one end of said tube, a conductor extending through said cover, and a cathode removably carried by said conductor, the electrolyte within said tube including an acid and an oxidizing agent, and said tube and said conductor being of material unaffected chemically by said electrolyte.

9. An electric battery including a vessel having a peripheral wall provided with a conducting lining of a material which is unaffected chemically by the electrolyte, a portion of the lining having an anode comprising a covering of carbon impregnated with a non-conducting material to prevent penetration of the electrolyte through the carbon to the wall of the vessel.

10. An electric battery, including an electrolyte container formed of aluminum and provided with a lead lining, an anode sleeve of carbon secured to said lining and spaced from the ends thereof, said lining and container serving as the sole electric conductor from said sleeve to the exterior of the battery, and a combined electrolyte and depolarizing solution out of contact with said sleeve when the battery is in upright, non-current generating position.

11. An electric battery including a metal tube having a protecting lead lining, a carbon sleeve electrode on the inner surface of said lining and having its pores filled with a material non-permeable to liquids or gases to prevent contact of the electrolyte with the surface of the lining covered by said sleeve, a zinc electrode within said tube, and an electrolyte solution including an oxidizing agent and an acid.

12. An electric battery including a metal tube having a protecting lead lining, a carbon sleeve electrode on the inner surface of said lining and having its pores filled with a material non-permeable to liquids or gases to prevent contact of the electrolyte with the surface of the lining covered by said sleeve, a zinc electrode within said tube, and an electrolyte solution including an oxidizing agent and an acid, said electrolyte being out of contact with said carbon sleeve except during current generating periods.

Signed at New York in the county of New York and State of New York this 8th day of June, A. D. 1927.

Dr. ALFRED SCHMID.